United States Patent Office 3,733,264
Patented May 15, 1973

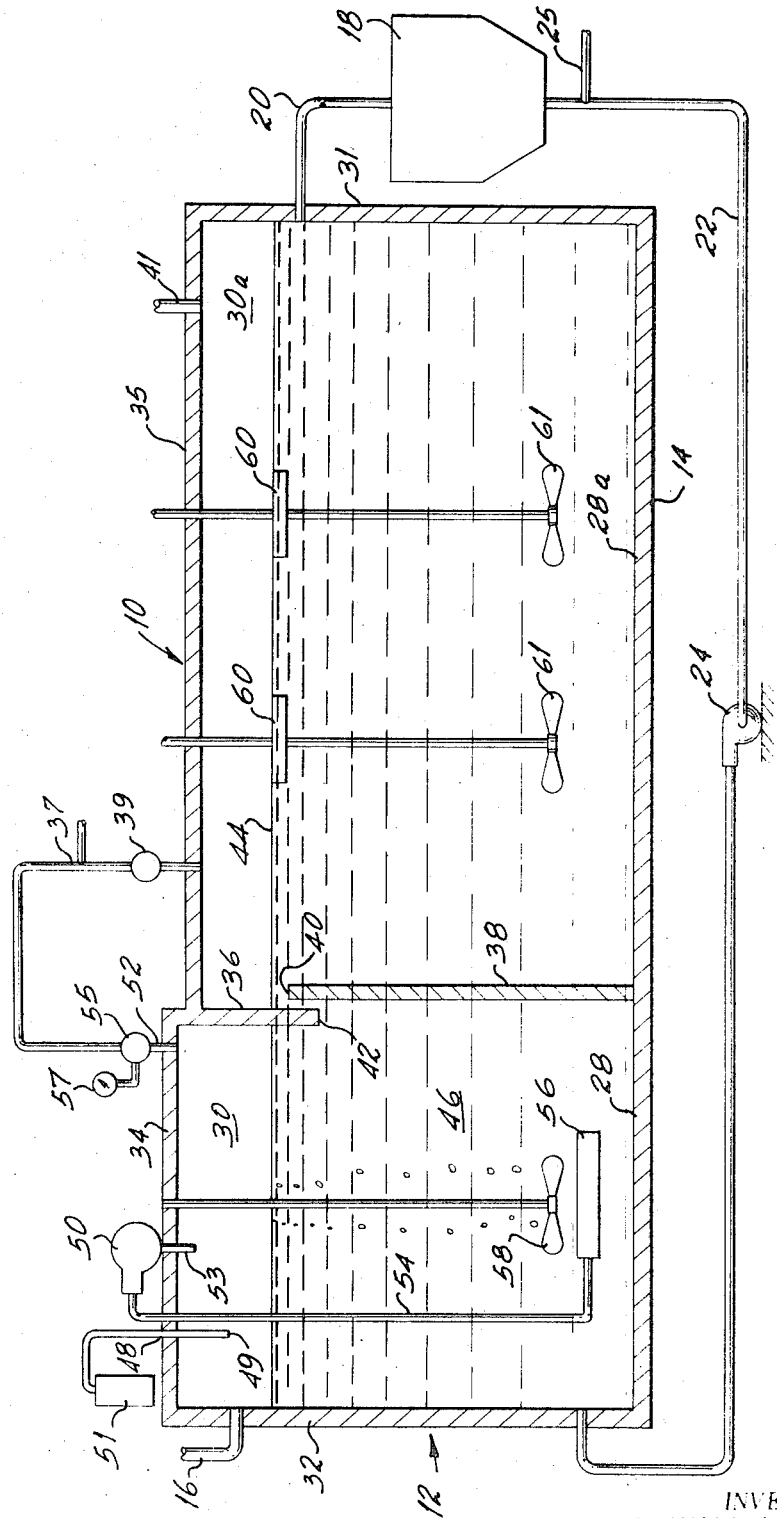

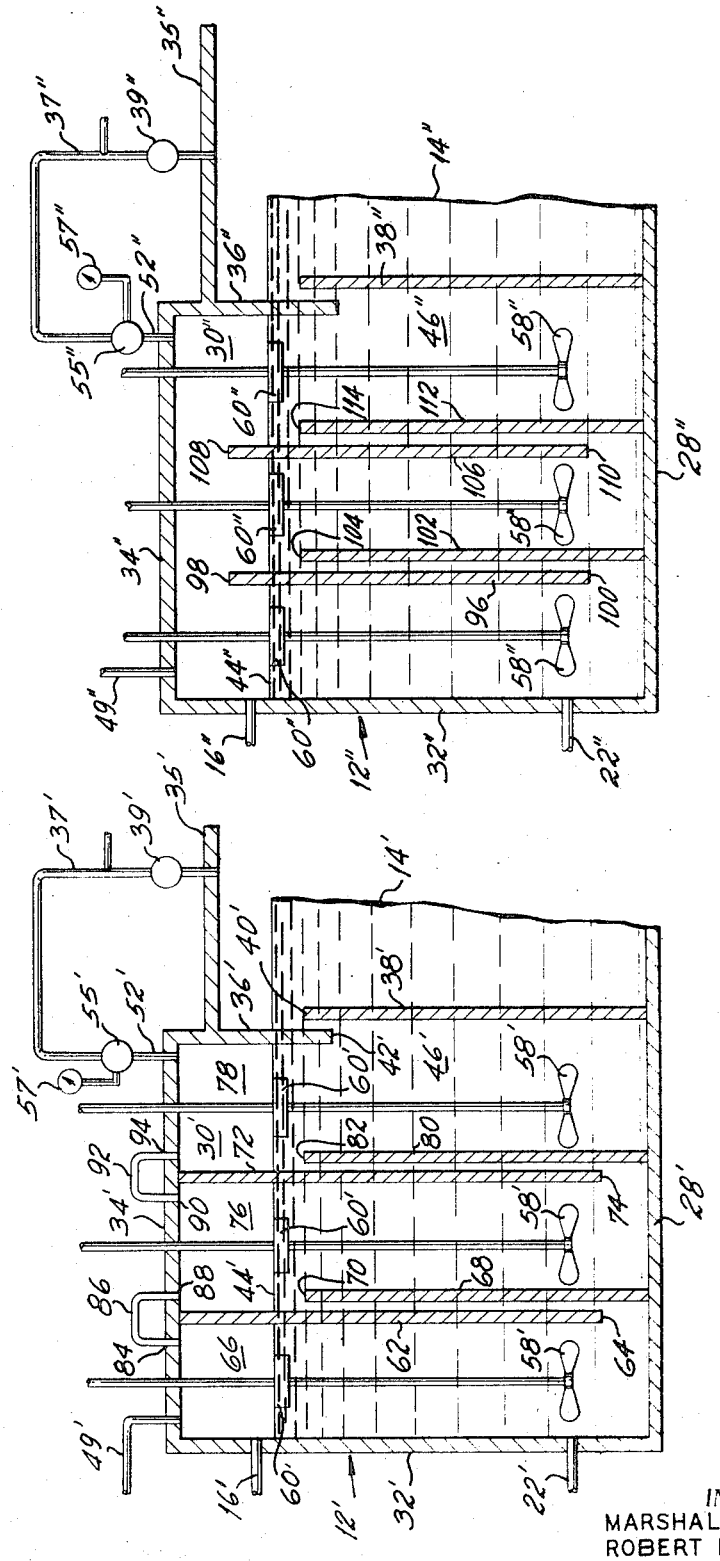

3,733,264
ACTIVATED SLUDGE SEWAGE TREATMENT PROCESS AND SYSTEM
Marshall L. Spector, Belle Mead, N.J., and Robert D. Jones, Allentown, and Curtis S. McDowell, Macungie, Pa., assignors to Air Products & Chemicals, Inc., Allentown, Pa.
Filed Mar. 18, 1971, Ser. No. 125,603
Int. Cl. C02c 1/10
U.S. Cl. 210—7     4 Claims

ABSTRACT OF THE DISCLOSURE

An activated sludge sewage treatment process and system which includes an initial enclosed aeration chamber providing a vessel for a mixed liquor formed from a liquid biologically degradable waste and recirculated sludge where the liquor is aerated in an oxygen enriched environment and a subsequent aeration chamber where the liquor, after being treated in the initial chamber, is aerated in the subsequent chamber in the presence of atmospheric air or a gas which has a slightly higher percentage of oxygen enrichment than atmospheric air. The system is designed so that between 15 to 95% of the oxygen utilized by the mixed liquor, to effect biological degradation, is utilized by the liquor in the initial chamber and the remainder of the oxygen utilized by the liquor for biological degradation is utilized in the liquor when the liquor is in the subsequent aeration chamber.

BACKGROUND OF THE INVENTION

This invention relates to an activated sludge sewage treatment process and system and, more particularly, to a process and system which utilizes an initial enclosed areation chamber into which is injected oxygen or an oxygen enriched gas which contacts the mixed liquor being aerated in an initial treatment stage and a subsequent aeration chamber which is preferably also closed where the mixed liquor is treated with substantially atmospheric air.

It is well established that domestic sewage, as well as waste from commercial and chemical operations which create a biologically degradable material, must be treated before being discharged into a receiving body or stream of water. Various processes and systems have been proposed for treating such waste. One of the most popular processes is the activated sludge process.

In the activated sludge process, the waste to be treated is aerated in the presence of microorganisms until the microorganisms have stabilized the organic matter in the waste. The microorganisms, while stabilizing the organic matter, require a supply of oxygen in order to function in an aerobic state.

The ecology of the system may be traced from the organic nutrients of the waste which is fed into the system and serves as food for the microorganisms which live off the organic matter in the waste. In addition to requiring oxygen as a reactant, the system requires oxygen to maintain an aerobic condition and function most effectively so as to not generate odors or create other unwanted effects.

With conventional activated sludge systems, it is necessary to aerate the mixed liquor, i.e. a mixture of BOD containing water and microorganisms, so that oxygen may be transferred from the air to the liquor. This oxygen serves as a supply for the microorganisms to effect biological degradation. In an activated sludge treatment process or system, the time to produce sludge from incoming waste without seeding would be long and uneconomical. Accordingly, in an activated sludge system, a portion of sludge produced is removed from a settling chamber and recirculated to incoming waste. Thus, the recirculated sludge supplies the microorganisms necessary to stabilize the incoming waste material.

In a conventional activated sludge system, the waste material which is to be treated is usually first passed into a primary sedimentation tank or basin where settable solids are permitted to settle out. The remaining liquor is then transferred to an activated sludge aeration tank or chamber. If desider, the primary sedimentation tank may be eliminated although it is generally good practice in at least large installations to use a primary tank. The effluent from the primary tank is then fed to the activated sludge areation chamber where the waste liquid is mixed with sludge containing the necessary microorganisms which have resulted from prior treated waste. This forms a mixed liquor which is aerated for a period of time in the aeration tank.

The aeration is usually accomplished by means of diffusing air into the mixed liquor so that it bubbles upwardly through the liquor or by mechanically stirring or agitating the liquor within the tank so as to contact the oxygen in the air. These aeration methods are directed toward the desired result of both satisfying the oxygen demand of the mixed liquor and maintaining an adequate dissolved oxygen level in the mixed liquor.

The amount of oxygen transferred to the liquor is of importance since oxygen transfer is one of the primary limiting factors influencing the efficiency of an activated sludge system. The demand of oxygen is a direct function of the biological metabolism in the system. The greatest demand for oxygen may be expected to occur at that portion of the aeration tank or chamber when the food (the form of waste) and the microorganisms are initially mixed together. If the demand for oxygen is substantially greater than the supply, anaerobic conditions will set in and problems will develop in operating the system.

Adequate dissolved oxygen levels result in a healthy biomass which permit stable operation of the system because adequate driving force is maintained in the liquid phase.

In order for an activated sludge process to function properly, it is generally accepted that a dissolved oxygen level of at least 0.5 mg. per liter should be maintained at all times. As pointed out heretofore, oxygen is usually supplied to activated sludge waste treatment systems by either mechanical, diffused or a combination of mechanical and diffused aeration methods. With these air aeration methods, as far as it is known, there has been a low rate of oxygen transfer efficiency to the liquor and this has been considered one of the major engineering problems associated with activated sludge systems.

In aeration, oxygen in the air must be transferred from a bubble of gas to the liquor and then to the microorganism within the liquor. Since oxygen is a fairly insoluble gas, there is a problem of effecting a mass transfer of oxygen to the liquid phase. The rate of oxygen transfer to the liquid phase is a function of the difference between the saturation value of the liquid at the partial pressure of oxygen in the vapor phase and the dissolved oxygen level in the liquid and the surface area of contact between the liquid and the gas. Adding to the problems of oxygen transfer when air is used is the fact that only approximately 20.8% of air is oxygen. Theoretically, transfer of the oxygen from air is 20.8% of that from 100% pure oxygen.

In order to overcome this shortcoming of the percentage of oxygen in air, it has been suggested that substantially pure oxygen be utilized and diffused in an activated sludge system rather than air. Examples of suggested oxygen enriched activated sludge sewage treatment processes or of elevating the partial pressure of oxygen in air by operating under superatmospheric pressure are shown in U.S. Pats. 2,678,915, 3,356,609, 3,444,076, 3,547,811, 3,547,812, 3,547,813, 3,547,814 and 3,547,815. Of these, Pats. Nos. 3,547,811 through 3,547,815 describe activated sludge sewage treatment processes wherein the mixed liquor of BOD-containing water, such as municipal waste, and an active biomass, such as recirculated sludge, is aerated in a closed vessel in an oxygen enriched environment and held in the closed vessel until the mixed liquor has been biologically degraded and then separated into sludge and a lean effluent which can be discharged into a body of water.

The processes and apparatus disclosed in the aforementioned 3,547,811 through 3,547,815 patents, while generally effective to increase the capacity of waste treatment facilities by lessening the holding period to biologically degrade organic waste, necessitates, in large waste treatment facilities, the construction of essentially 100% enclosed aeration chambers and, when the system is operating, oxygen or oxygen enriched air is used to supply substantially all of the oxygen demand of the system.

Typically, in an activated sludge sewage treatment process, the aqueous organic wastes to be neutralized are added to an aeration chamber and sludge, containing active microorganisms to feed on the organic nutrients in the wastes, is added. Oxygen, either from the air or from an oxygen enriched gas is aerated through the liquor so that the oxygen can be dissolved in the liquor to support microorganism growth to neutralize the waste. The greatest demand for oxygen occurs at the head end of the aeration vessel when the food, i.e., the organic waste to be treated, and the microorganisms, i.e., recycled sludge, are initially mixed together.

SUMMARY OF THE INVENTION

Therefore, it is an object of the present invention to provide an improved activated sludge process and system for treatment of organic wastes which minimizes retention time of the mixed liquor in the aeration tanks while effectively neutralizing the waste for safe disposition.

According to the present invention, in an activated sludge sewage treatment process and system an initial closed aeration chamber is provided into which mixed liquor of organic waste, recycled sludge and water is aerated in the presence of an oxygen enriched environment. The mixed liquor, after an initial retention period in the enclosed chamber, is allowed to pass to a subsequent enclosed aeration tank where further aeration is accomplished with atmospheric air or air having a slight oxygen enrichment until the neutralization process is completed to a safe level. It is believed that the combination of an initial enclosed chamber with a substantially oxygen enriched environment for the initial treatment step and a subsequent aeration chamber utilizing atmospheric air or slightly oxygen enriched air for the final treatment step effectively neutralizes the organic wastes in a minimum time with the beneficial aspect that high cost for purified oxygen usage are minimized.

BRIEF DESCRIPTION OF THE DRAWING

FIG. 1 is a schematic and diagrammatic sectional side view showing an activated sludge system in accordance with the present invention; and FIGS. 2 and 3 are schematic and diagrammatic sectional side views of alternative embodiments of the initial enclosed chamber of the activated sludge system of the present invention.

With reference now to the drawing and particularly FIG. 1, there is shown an activated sludge sewage treatment facility 10 which includes an initial enclosed aeration chamber or tank 12 and a subsequent enclosed aeration chamber or tank 14. An inlet 16 is provided in the initial aeration chamber 12 to allow influent from a primary sedimentation tank (not shown), where settleable solids are screened, to enter the enclosed aeration tank 12. A clarifier or settling tank 18 receives the treated waste material or sludge from aeration tank 14 through a supply line 20 and a portion of the sludge is removed from sedimentation tank 18 and recirculated through line 22 by a pump 24 to the initial aeration chamber 12 to provide the microorganisms to furnish the activated sludge in the activated sludge treatment facility 10. The remainder of the sludge is withdrawn from the settling tank 18 through line 25 for appropriate disposition.

Aeration chamber 12 is a closed chamber including a bottom wall 28, upstanding side walls 30 and an end wall 32 which are closed by a top wall 34. A front wall member 36 depends from the top wall 34 and an upstanding front wall member 38 spaced forwardly of the wall portion 36 extends upwardly from bottom wall 28 to a termination 40 which is slightly higher in elevation than the lower portion 42 of depending wall member 36. Level 40 of front wall 38 is below the surface level 44 of the mixed liquor 46 which includes the influent waste from inlet 16 and sludge recirculated from the sedimentation tank 18. Thus, because partial front wall portion 36 extends below the level of the liquid level 44, a closed aeration chamber is formed and liquid flows from aeration chamber 12 to aeration chamber 14 over the upstanding wall member 38. Aeration chamber 14 includes a bottom wall 28a, side walls 30a, end walls 38 and 31 and a top wall 35.

According to the process and system of treating waste material of the present invention, the mixed liquor 46 comprising the influent waste and recirculated activated sludge is initially treated in the presence of an oxygen enriched environment. Accordingly, aeration chamber 12 is provided with a gas inlet 48 in top wall 34 through which an oxygen enriched gas is supplied to the chamber above the surface 44 of the liquor. The oxygen enriched gas is obtained from a source of oxygen 51 and may be supplied to aeration chamber 12 through supply line 49 in any desired percentage of oxygen enrichment. A recirculation pump 50 is provided having a suction end 53 communicating with the interior of aeration chamber 12 to withdraw oxygen enriched gas from the aeration chamber 12 above the surface of the liquor and is pumped by pump 50 through a line 54 to one or more submerged aerators 56 so that oxygen enriched gas is allowed to bubble up through the mixed liquor 46. Agitators 58 are also preferably provided to agitate the mixed liquor 46 to increase the efficiency of the oxygen transfer from the oxygen enriched gas to degrade the organic material in the waste of the mixed liquor 46 and to maintain the solid waste material in solution and preclude settling of the solids.

A gas vent 52 is provided in top wall 34 to vent gases from chamber 12 and the vent 52 is equipped with a flow control valve 55 which is equipped with an oxygen analyzer 57. The oxygen analyzer 57 determines the percentage of oxygen in the vented gases and is used to throttle control valve 55 to open or close the valve in order to maintain a predetermined desired oxygen content in the vented gases. Thus, if it is desired to maintain an oxygen content of 50% in the vented gas, the analyzer controls valve 55 so that the valve is opened only when the analyzer senses that the oxygen content of the vent gas is 50% or less.

A gas inlet line 37 is provided in the top wall of aeration chamber 14 which is in communication with vent 52 of chamber 12 and with the atmosphere. A suction pump 39 may be provided to assist in the flow of gas and air into chamber 14 through line 37 and a vent outlet 41 is provided in top wall 35 to exhaust gas from chamber 14. Thus, when valve 55 is open and oxygen enriched gas flows from chamber 12, the gas admitted to chamber 14 comprises ambient air and the oxygen enriched gas exhausted from chamber 12 so that the gas admitted to chamber 14 is substantially ambient air slightly enriched with oxygen as a result of the oxygen enriched content of the gas exhausted from chamber 12. Preferably, the oxygen enrichment of the gas admitted to subsequent chamber 14 is maintained below about 35% oxygen enrichment.

Because the oxygen enriched gas supplied by source 51 is under pressure, the feeding of oxygen enriched gas to chamber 12 is by demand feeding. Thus, when the gas pressure in chamber 12 falls below the pressure at which oxygen enriched gas is supplied, because oxygen is being transferred to the mixed liquor 46, more oxygen enriched gas is supplied from source 51 through line 49. Valve 55 then closes until the analyzer detects the predetermined oxygen content of the vent gas before opening again to vent gas from chamber 12. While vent 52 is closed, recirculation pump 50 which operates continuously throughout the process circulates oxygen enriched gas to the aerators 56 to be bubbled up through the mixed liquor 46 to enable oxygen to be transferred to the mixed liquor.

After the mixed liquor 46 has been treated in initial enclosed aeration chamber 12, as will be explained more fully hereinbelow, the mixed liquor flows over the upstanding front wall member 38 into the subsequent aeration chamber 14 where the mixed liquor is further aerated by a plurality of surface aerators 60 in the substantially atmospheric environment until the treated mixed liquor flows through line 20 to the sedimentation tank 18. Below the surface agitators 61 may also be employed to maintain the solids in solution and prevent settling in the areation chamber 14.

FIGS. 2 and 3 show alternate constructions for the enclosed aeration chamber and it is seen in FIG. 2 that aeration chamber 12' includes a bottom wall 28', side walls 30', end wall 32', a top wall 34' with depending partial front wall portion 36' and an upstanding front wall segment 38' spaced forwardly of depending front wall portion 36' as in the embodiment of FIG. 1. Aeration chamber 12' also includes a first depending wall member 62 which depends from top wall 34' to a level 64 above bottom wall 28' to define a first sub-chamber 66. An upstanding wall member 68 is provided spaced forwardly of wall 62 and terminating at a level 70 below the surface 44' of the liquor. Walls 62 and 68 cooperate to provide a restricted flow passage for the liquor from sub-chamber 66.

A second depending wall 72 spaced forwardly of upstanding wall 68 extends to a level 74 above bottom wall 28' to define second and third sub-chambers 76 and 78, respectively. An upstanding wall segment 80 is also provided in sub-chamber 78 spaced forwardly of wall 72 which extends upwardly from bottom wall 28' to a level 82 below the surface 44' of the mixed liquor 46'. Wall 80 cooperates with wall 72 to provide a restricted flow passage for the liquor from sub-chamber 76 to sub-chamber 78.

An oxygen enriched gas inlet 49' is also provided in the first sub-chamber 66 and a vent 52' including a control valve 55' and oxygen analyzer 57' is provided in the third sub-chamber 78.

A gas exhaust outlet 84 is provided in sub-chamber 66 which is interconnected by a line 86 to a gas inlet 88 in sub-chamber 76 and a gas exhaust outlet 90 is connected by a line 92 to a gas inlet opening 94 in sub-chamber 78 so that the gas flow is staged within aeration chamber 12' between the sub-chambers 66, 76 and 78, respectively, before being exhausted through exhaust opening 52'.

Agitators 58' are also preferably provided in each of the sub-chamber 66, 76 and 78 to agitate the mixed liquor in each sub-chamber and preferably surface aerators 60' are also provided to increase the oxygen transfer efficiency between the oxygen present in the oxygen enriched gas and the degradable material in the waste products. The agitators are preferably provided for liquid stirring and to prevent settling of solid material in the areation chamber. It is also to be understood that submerged turbines may also be used in place of the submerged agitators.

In the embodiment shown in FIG. 2, the mixed liquor and the oxygen enriched gas are both staged sequentially between sub-chamber 66, 76 and 78. The oxygen enriched gas supplied through inlet line 49' to sub-chamber 66 from the source may be blended to any desired oxygen concentration and is supplied to sub-chamber 66 under demand pressure as in the embodiment shown in FIG. 1. Thus, when the gas pressure within aeration chamber 12' falls below the pressure at which the oxygen enriched gas is supplied, additional oxygen enriched gas will flow from the source through supply line 49' to sub-chamber 66 in aeration chamber 12'.

Vent control valve 55' and analyzer 57' function in the same manner as valve 55 and analyzer 57 in the embodiment of FIG. 1 but, because gas flow and liquid flow are staged between the sub-chambers, the oxygen content of the vent gas can be regulated more closely and may even be regulated to maintain an oxygen content below 20.8% oxygen if desired.

Accordingly, with the analyzer 57' and control valve 55' set to throttle vent gas flow when the oxygen content of the vent gas is at or below a desired oxygen concentration, control valve 55' opens to vent gas to subsequent aeration chamber 14' through line 37' but closes when the analyzer 57' detects an oxygen content greater than the desired oxygen concentration. When desired, the oxygen content of the gas exhausted from vent 52' can be maintained below 20.8% oxygen and, when the system is so operated, the gas exhausted from vent 52' is vented to the atmosphere. Thus, gas drawn into chamber 14' through line 37' is atmospheric air or may be air which is slightly oxygen enriched, i.e., below 35% oxygen enrichment, from a source of purified oxygen (not shown).

When valve 55' closes, the pressure within aeration chamber 12' has a tendency to build up to a level in excess of the pressure at which oxygen enriched gas is supplied to aeration chamber 12' through supply line 49'. Hence, no further oxygen enriched gas flows into chamber 12'. While the chamber 12' is in this closed state, the liquor 46' is aerated in the presence of the oxygen enriched environment until sufficient oxygen is transferred from the oxygen enriched environment to reduce the gas pressure within chamber 12' to allow additional oxygen enriched gas to flow into the chamber or to deplete the oxygen content of the gas in sub-chamber 78 to a concentration below the predetermined exhaust concentration to allow valve 55' to open and vent the gas to subsequent chamber 14'. When valve 55' is open, the gas pressure in chamber 12' is reduced to allow additional oxygen enriched gas to flow into the chamber through supply line 49'.

Reference is now made to FIG. 3, where enclosed aeration chamber 12" is shown including bottom wall 28", side walls 30", end wall 32" with depending front wall portion 36" and upstanding front wall segments 38" as in the embodiments of FIGS. 1 and 2. Within enclosed aeration chamber 12" a partial wall segment 96 extends between the side walls 30" from a level 98 above the surface level 44" of the mixed liquor 46" to a level 100 spaced above bottom wall 28". A partial upstanding wall segment 102 extending upwardly from bottom wall 28" between end walls 30" to a level 104 below the surface level 44' of the mixed liquor 46" is provided spaced forwardly of wall segment 96 to form a restricted flow passage in the liquor. A second partial wall segment 106 is provided spaced forwardly of wall segment 102 and is similar to wall segment 96. Wall segment 106 extends between side walls 30″ terminating at a level 108 and 110 above the surface level of the liquor and spaced from bottom wall 28″, respectively. A partial upstanding wall segment 112 extends upwardly from the bottom wall 28″ and terminates at a level 114 below the liquor surface level and is spaced forwardly of wall 106 to provide a restricted flow passage for the liquor.

An oxygen enriched gas inlet line 49″ is provided in top wall 34″ as well as a gas vent 52″, control valve 55″ and analyzer 57″, as in the embodiment of FIG. 1. Suitable agitators 58″ may also be provided to agitate the mixed liquor as well as surface aerators 60″. The enclosed chamber above the surface of the liquor 46″ is subjected to the same uniform gas pressure as in the embodiment of FIG. 1 while flow of the mixed liquor through aeration chamber 12″ is staged. The gas is also vented through line 37″ to subsequent aeration chamber 14″ as in the embodiments of FIGS. 1 and 2.

As noted hereinabove, it has been determined that the greatest demand for oxygen in an activated sludge sewage treatment facility occurs at the head end of the aeration tank when the food, i.e., the influent waste, and the microorganisms in the recirculated sludge are initially mixed together. According to the system and process of the present invention, an oxygen enriched gas on the order of 21–99.9% by volume oxygen may be utilized in the first enclosed aeration stage to provide between 15–95% and preferably 50–95% of the oxygen transferred to the mixed liquor in this enclosed aeration zone to satisfy the oxygen demand for microorganism growth to neutralize the waste material.

In a laboratory simulation of the process and system of the present invention, three test runs were made and an analysis of the test runs is presented in Table I below. Test runs 1 and 2 used a synthetic organic waste water comprising a solution made up of 256 parts glucose, 256 parts glycine, 57 parts aniline, 57 parts sodium acetate, 11.4 parts phenol, 28.2 parts ammonium sulfate and 19 parts phosphoric acid. Water was then added to the solution to make a 3000 ml. total to provide a stock solution which had a COD of 215,000 mg./l. This stock solution was then diluted with water to obtain the COD values of the influent for Runs 1 and 2.

The mixed liquor was staged between three twelve liter vessels maintained at two-thirds liquid level to a settling tank. Each of the vessels was provided with an overflow weir so that mixed liquor from the first vessel overflowed to the second vessel and mixed liquor from the second vessel overflowed to the third vessel with the overflow from the third vessel flowing into the settling tank. In the settling tank the effluent from the aeration basin was allowed to settle and a portion of the sludge from the settling tank was recycled to the first stage vessel. The synthetic organic influent waste water was pumped into the first vessel and was agitated by diffusion of an enriched oxygen bearing gas which was bubbled through the mixed liquor through a diffuser plate near the bottom of the vessel at the rate of 6 liters of gas per minute. The oxygen content of the gas bubbled through the mixed liquor in the first stage was adjusted to provide an oxygen enriched environment. The oxygen content of the gas bubbled through the later stages was maintained at less than 20.8% oxygen in order to demonstrate operation with atmospheric air or less.

This highlights the adequacy of air or even oxygen lean air to function effectively in the subsequent aeration chamber of the processing system of the present invention when the initial stage is treated in an oxygen enriched environment according to the principles of the present invention.

Test Run 3 was conducted similar to test Runs 1 and 2 except that the first stage vessel was enclosed with a cover and equipped with a recycle compressor to more nearly simulate the first stage of the processing system of the present invention. Test run 3 also utilized an actual organic waste from a chemical processing plant instead of the synthetic organic waste used in test Runs 1 and 2.

The results of the three test runs are summarized in Table I below.

TABLE I

Summary of Operational Conditions and Results for a Staged Enriched Oxygen-Air Activated Sludge Treatment Process

| | Run | | |
|---|---|---|---|
| | 1 | 2 | 3 |
| Percent sludge recycle | 31 | 49 | 37 |
| Detention time (each stage, hrs.)[1] | .53 | .38 | 1.17 |
| Detention time (overall, hrs.)[1] | 1.58 | 1.13 | 3.51 |
| Influent flow rate (liters/day)[1] | 255 | 313 | 103 |
| COD influent (mg./liter) | 252 | 483 | 785 |
| BOD influent (mg./liter) | 188 | | 280 |
| COD influent (mg./liter) | 22 | 22 | 259 |
| BOD influent (mg./liter) | 3–4 | | 30 |
| Percent COD removed | 91 | 95 | 67 |
| Percent BOD removed | 98 | 9,480 | 89 |
| MLSS (mg./liter) | 5,880 | 9,480 | 7,450 |
| MLVSS (mg./liter) | 5,315 | 8,628 | 6,332 |
| TSS$_{SR}$ (total suspended solids-sludge recycled mg./liter) | 24,986 | 27,521 | 23,400 |
| VSS$_{SR}$ (volatile suspended solids-sludge recycled mg./liter) | 23,480 | 21,741 | 20,000 |
| F/M COD 1st stage weight of COD/weight of MLSS per 24 hrs.) | 1.65 | 2.40 | 2.2 |
| F/M COD overall (weight of COD/weight of MLSS per 24 hrs.) | .55 | .80 | .74 |
| Sludge detention time (hrs.) in settler | | 1.3 | 4.8 |
| SVI (sludge volume index, ml./g. TSS) | 94 | 78 | 100 |
| DO$_2$/DT 1st stage (mg./l/hrs.) | 181 | 268 | 168 |
| DO$_2$/DT 2nd stage (mg./l/hrs.) | 66 | 81 | 69 |
| DO$_2$/DT 3rd stage (mg./l/hrs.) | 51 | 70 | 34 |
| Percent O$_2$ in gas (1st stage) | 50 | 63 | 80 |
| Percent O$_2$ in gas (2nd stage) | 12 | 14 | 10 |
| Percent O$_2$ in gas (3rd stage) | 5 | 11 | 10 |
| Dissolved oxygen 1st stage (p.p.m.) | 10 | 10 | 30 |
| Dissolved oxygen 2nd stage (p.p.m.) | 1–2 | 1–2 | 1–2 |
| Dissolved oxygen 3rd stage (p.p.m.) | 1–2 | 1–2 | 1–2 |

[1] Operation of Test Runs based on 22 hour day; 2 hours per day used for analytical procedures.

As is evident from Table I, the dissolved oxygen level for the first stage of Runs 1 and 2 were held at 10 p.p.m. and for the first stage of Run 3 was held at 30 p.p.m. by varying the oxygen enrichment aerated through the first stage vessel. For Run 1 a 50% oxygen enriched gas was used, for Run 2 a 63% oxygen enriched gas was used and for Run 3 an 80% oxygen enriched gas was used to maintain the observed dissolved oxygen levels.

From a determination of the milligrams of oxygen utilized per liter of mixed liquor per hour (DO$_2$/DT), it is seen that in Run 1 in all three stages the total of the weight of oxygen utilized per liter per hour is 298 with 181 mg. per liter per hour or approximately 61% of the oxygen utilized being utilized in the first stage. Similarly, for Run 2, it can be seen that approximately 64% of the oxygen utilized was utilized in the first stage and for Run 3 approximately 62% of the oxygen utilized was utilized in the first stage.

It is also significant to note that all runs showed high percentages of COD (chemical oxygen demand) and BOD (biological oxygen demand) removed while maintaining an acceptable sludge volume index, which is an indication of the liquid volume occupied by one gram of dried sludge. These results were also achieved by maintaining an oxygen enriched gas only in the first stage for all runs, and, in fact, providing an oxygen lean gas (a lower percentage of oxygen than found in atmospheric air) in the final stages. This serves to highlight the adequacy of atmospheric air or lower oxygen concentrations for utilization in the subsequent aeration stage of the processing system of the present invention and shows the utilization of oxygen in the oxygen enriched environment at the most critical stage of oxygen need, i.e., when the sewage influent and recycled sludge are initially mixed together.

Ideally, in the process and system of the present invention between 15–95% and most preferably 50–95% of the dissolved oxygen requirements will be provided for in the first closed stage of the system by utilizing an oxygen enriched gas between 21–99.9% and preferably between 50 and 99.9% oxygen content.

The desired oxygen enriched content of the gas supplied to the first stage will be dependent upon the degree and efficiency of agitation and aeration within the first stage. Thus, with a high horsepower input and/or high mechanical efficiency, the oxygen enriched content of the gas supplied to the first stage may be lower than the oxygen content of a gas used where there is a lower horsepower input and/or lower mechanical efficiency.

In actual practice, oxygen will be utilized in the activated sludge process where it is neither economically nor technically feasible to obtain both the desired oxygen tranfer rate and dissolved oxygen levels with air as the oxygen source. The efficiency of mechanical aerators has been increasing in recent years and and should continue to improve. Thus, while the present example utilizes pure oxygen to supply approximately 60–70% of the total biological demand, a higher percentage of enriched oxygen and a larger enclosed aeration volume will be required where a less efficient aerator is used or where less horsepower input is used. Conversely, where it is possible to use a higher horsepower input or as more efficient aerators become available, it will be possible to supply a lesser percent of the total oxygen demand via enriched oxygen and a lesser enclosed aeration volume be required.

Physically, with the system of the present invention the volume of mixed liquor held in the initial enclosed aeration chamber compared to the total volume of the mixed liquor in both the enclosed aeration chambers will be between 20 and 90% and most preferably from 30 to 75%.

It is thus seen that the system and process of the present invention provides an effective means for treating organic waste material by an activated sludge treatment process which combines an initial enclosed treatment stage where the waste is treated in an oxygen enriched environment, and an enclosed substantially atmospheric treatment stage to obtain maximum utilization for the enriched oxygen supplied to the initial treatment stage. More importantly, with an enclosed subsequent treatment stage maximum utilization of enriched oxygen is obtained as the exhaust gas from the initial enclosed treatment stage is utilized where this exhaust gas has an oxygen concentration greater than that found in atmospheric air. Because the greatest need for high oxygen utilization is in the initial stage, and because the test runs demonstrate that oxygen concentrations even below that found in atmospheric air can be utilized in the final treatment stage, it is evident that significantly more beneficial results ensue where high oxygen concentrations are prevalent. Thus, by enclosing the subsequent treatment stage and utilizing the availability of enriched oxygen sources greater utilization of available oxygen in the system is possible.

What is claimed is:

1. An activated sludge sewage treatment process for reducing the biological oxygen demand (BOD) of a waste influent to a final predetermined level comprising:
    (a) inroducing biodegradable waste influent and activated sludge forming a mixed liquor into a first covered aeration zone,
    (b) introducing oxygen-rich aeration gas comprising at least 50% oxygen into said first covered aeration zone,
    (c) continuously aerating said mixed liquor in repeated contact with said oxygen-rich aeration gas for a period of time sufficient to supply between 50% and 95% of the total BOD of said mixed liquor while maintaining a dissolved oxygen level in said mixed liquor of at least 6 p.p.m. in at least the first portion of said first covered aeration zone,
    (d) passing said partially BOD reduced mixed liquor into a subsequent covered aeration zone,
    (e) introducing a second aeration gas essentially composed of atmospheric air into said subsequent covered aeration zone,
    (f) maintaining the oxygen content of said second aeration gas substantially below 35% by volume throughout said subsequent covered aeration zone, and
    (g) further aerating said partially BOD reduced mixed liquor in repeated contact with said second aeration gas for a period of time sufficient to reduce the BOD of said mixed liquor to said final predetermined level.

2. The process as claimed in claim 1 wherein said second aeration gas consists solely of atmospheric air.

3. The process as claimed in claim 1 wherein said second aeration gas is composed of a major volume of atmospheric air and a minor volume of oxygen-enriched aeration gas discharged from said first covered aeration zone.

4. The process as claimed in claim 3 wherein the first aeration step in said first enclosed aeration zone is conducted in a series of aeration gas stages having progressively lower concentrations of oxygen in said aeration gas, said first aeration step being continued at least until the oxygen content of the aeration gas in the last aeration gas stage is below 35% by volume, and said second aeration gas comprises a major volume of atmospheric air and a minor volume of aeration gas discharged from said last aeration gas stage.

References Cited
UNITED STATES PATENTS

| | | | |
|---|---|---|---|
| 3,054,602 | 9/1962 | Proudman | 210—220 X |
| 3,547,815 | 12/1970 | McWhirter | 210—15 X |
| 3,547,811 | 12/1970 | McWhirter | 210—15 X |
| 3,444,076 | 5/1969 | Sekikawa et al. | 210—15 X |

MICHAEL ROGERS, Primary Examiner

U.S. Cl. X.R.

210—15, 195, 220